United States Patent [19]
Simpson et al.

[11] Patent Number: 5,938,516
[45] Date of Patent: Aug. 17, 1999

[54] GRINDING WHEEL AND METHOD FOR REMOVAL OF SPRUES AND RISER PADS FROM CAST RAILCAR WHEELS

[75] Inventors: John F. Simpson, Naperville; Brian L. VanLaar, Lisle, both of Ill.; Gary W. Bendik, Clyde, Mich.

[73] Assignee: AMSTED Industries Incorporated, Chicago, Ill.

[21] Appl. No.: 08/992,193

[22] Filed: Dec. 17, 1997

[51] Int. Cl.⁶ ................................................. B23F 21/03
[52] U.S. Cl. ............................................. 451/541; 451/58
[58] Field of Search ................................. 451/541, 342, 451/508, 58

[56] References Cited

U.S. PATENT DOCUMENTS

| | | | |
|---|---|---|---|
| 1,753,377 | 4/1930 | Jackson | 451/342 |
| 3,593,461 | 7/1971 | Gay | 51/88 |
| 4,074,467 | 2/1978 | Robillard . | |
| 4,083,151 | 4/1978 | Jessup et al. . | |
| 4,163,346 | 8/1979 | Matson . | |
| 4,193,227 | 3/1980 | Uhtenwoldt . | |
| 4,363,695 | 12/1982 | Uhtenwoldt . | |
| 4,369,046 | 1/1983 | Bruschek et al. | 51/298 |
| 4,393,626 | 7/1983 | Schroer . | |
| 4,471,580 | 9/1984 | Robillard . | |
| 4,599,786 | 7/1986 | Uhtenwoldt . | |
| 4,679,358 | 7/1987 | Sieradzki | 51/165.72 |
| 4,774,788 | 10/1988 | Shacham et al. . | |
| 4,998,384 | 3/1991 | Bouchard et al. . | |
| 5,025,594 | 6/1991 | Lambert, Jr. et al. . | |
| 5,209,021 | 5/1993 | Christie et al. . | |
| 5,319,892 | 6/1994 | Christie et al. | 51/327 |
| 5,363,702 | 11/1994 | Catot et al. | 73/598 |

*Primary Examiner*—David A. Scherbel
*Assistant Examiner*—Dung Van Nguyen
*Attorney, Agent, or Firm*—Edward J. Brosius; F. S. Gregorczyk; Stephen J. Manich

[57] ABSTRACT

An abrasive material grinding wheel for grinding the plate front face of an as-cast railroad wheel to remove sprues and riser pads has a projecting and leading edge to extend the ground surface into close proximity to a hub and fillet section of the railroad wheel, which grinding wheel has a reduced wall thickness, a recess for receiving a retaining flange to reduce the elements extending from the outer face of the grinding wheel, and a sloped outer grinding surface projecting the leading edge and providing a grinding-wheel surface adequate to grind the entire riser pad from the plate front surface between the wheel rim and the front hub fillet, and to generally retain the grinding wheel outer surface contour during multiple grinding operations.

7 Claims, 4 Drawing Sheets

GRINDING WHEEL AND METHOD FOR REMOVAL OF SPRUES AND RISER PADS FROM CAST RAILCAR WHEELS

BACKGROUND OF THE INVENTION

1. Field of the Invention

The present invention relates to grinding wheels and more specifically to grinding wheels to remove the sprues and riser pads from the casting process for railroad car wheels. The railroad wheels generally are cast in a graphite mold, which includes sprues and risers for the molten metal. However, sprues and riser pads represent extraneous metal on the product after the casting process, which metal must be removed before further wheel processing.

The preferred method for manufacturing cast steel railroad wheels is the bottom pressure casting foundry operation wherein molten steel under pressure is forced upwardly into a graphite mold and filled from the bottom upwardly. Bottom-pouring pressure casting operations eliminate many of the concerns associated with the more traditional top-pouring technique for molten steel in foundry operation. These concerns include metal splashing and insufficient filling of molds. In the casting of railroad wheels, the front side of the wheel, which also corresponds with the top half of the mold, typically has a raised center hub portion. There are generally from 9 to 14 raised sections or risers extending from the front plate portion of the wheel near the hub, which number depends on the size of the wheel.

Risers are designed to hold additional metal to fill downwardly into the mold during the cooling and solidification of the wheel just after pouring. The raised sprues extending from the plate are remnants of the risers. The sprues are difficult to remove and would require considerable effort if removed by hand-held grinders. As a consequence, hand-held grinding operations are not generally used in present wheel-making operations. One method for removal of cast railroad-wheel sprues is a so-called sprue washing operation, which is a carbon-arc melting of the raised sprue. In this technique, a hollow electrode melts the sprue and air blown through the hollow portion of the electrode blows away the molten metal. However, the molten metal from the sprue washing operation is deposited on adjacent sections of the wheel, which requires a subsequent time-consuming and awkward chipping process for removal of the spattered metal. Further, the sprue washing operation requires the operators to wear a protective suit with a separate airhood supply and adequate noise protection.

After completion of the sprue washing and chipping operations, the center raised hub section is removed during the flame cutting of the axle hub, which is later finished by a hub-boring operation. The cast steel wheel is then heat treated, cleaned by a shot-blast operation, and sprue-removed surface areas are finish ground. The finish grinding is typically a manual operation.

Machine grinding of ingots and billets is known in the steel industry. These operations typically scarf a cooled ingot surface to remove minor cracks or surface imperfections, although certain scarfing operations are preferred when the ingot is at an elevated temperature. An apparatus for the automatic grinding removal of sprues from a cast steel railroad wheel shortly after the wheel has been cast and solidified is taught in U.S. Pat. No. 5,209,021 to Christie et al.

In the Christie et al.—'021 patent, the sprues from cast steel railroad wheels are removed when the wheel has cooled from initial casting to a temperature of from 800°–1,200° F. (425°–650° C.). The grinding is accomplished by a heavy grinding wheel or stone approximately 25-inches in diameter and 3-inches thick (63 cm×7.6 cm). The grinding wheel is mounted on a spindle and arbor, and driven by a relatively large electric motor. Removal of sprues by the grinding operation and the finish grinding of the wheel to the final contour in the sprue areas can be done in a single operation with a single grinding wheel.

Almost all railroad wheels broadly have a shape with an inner hub portion, an outer tread portion including a flange, and a relatively thin metal web or plate connecting these inner and outer components. This web or connecting plate usually incorporates a curved contour for the promotion of strength, heat transfer or other physical characteristics associated with the intended wheel service application. The hub portion has an outer or front face, an inner or back face, and an axle through bore, which extends therebetween along the axle axis.

The tread portion of the wheel also has an outer or front face and an inner or back face with the flange radially extending from the back face as an annulus, and the tread tapered from the front face radially outwardly toward the flange.

Railroad wheels can be between 28 and 42 inches in diameter; the hub may have a diameter between about 10 and 13 inches; and, the connecting plate or web is contoured with either a concave or convex shape. Consequently, it can be appreciated that the sprue and riser pads on the contoured connecting plate may not be readily accessible for grinding, especially on smaller diameter railroad wheels where the riser pads are in close proximity to the protruding wheel hub. In addition, any mechanical secondary operations are expressly prohibited from negatively impacting the strength and integrity of the railroad wheel, as safe railroad wheel operation is a primary concern. No undue risks can be taken to compromise the structural integrity and performance of these railroad wheels, since wheel failure has the potential of producing a catastrophic event.

2. Prior Art

Railroad wheels are generally cast in graphite molds from either molten steel or iron. This casting practice has evolved over nearly a century of progress. Casting processes generally involve secondary mechanical practices to remove extraneous material or to true the casting to dimensional tolerances. These secondary operations are undesirable, as they are costly and time-consuming. However, removal of the extraneous material in finishing metal operations is necessary to provide products that are both functionally and aesthetically acceptable. Metal finishing operations include machining, flame cutting or torching and grinding. Hand grinding is used for some semi-finished goods, such as billets in a steel mill. However, for products that are to be transferred to a finishing line for shipment more careful and sophisticated tools are often used, such as grinding machines.

In the production of railroad wheels, it has been the practice to mount an as-cast wheel in a swing-frame grinding machine, and thereafter to carefully grind the sprue and riser pad. However, it had been found that the present grinding machine and grinding wheel apparatus cannot adequately access the railroad-wheel web to remove the entire riser pad areas, which are in close proximity to the hub. Further, it has been found that the presently available grinding wheels with square edges or corners could potentially mar the web surface at initial use of such grinding wheel, which could result in a rejected wheel product.

In the railroad industry, the railroad wheel sizes are generally large with diameters between about 28 and 42 inches and a weight in excess of 500 pounds. Thus, an apparatus to accommodate the secondary working of such large products is required to be large. However, the secondary operations themselves may be subtle and relatively delicate. For example, finish grinding of the bearing surface on a gear may have a tolerance of only a few ten thousandths of an inch. Alternatively, the bulk removal of extraneous material requires the placement of a relatively large diameter grinding wheel against a large surface in a very inconspicuous location to perform a finishing operation in a short time. Performance of a finishing operation in a short time relates to both operator time and the economic cost from work in process.

As noted above, railroad wheels are frequently finished by grinding operations, but as railroad wheels are large mass pieces, the equipment to hold and grind the railroad wheel is appropiately sized to accommodate this large mass. The grinding operation is performed by a grinding wheel on a spindle, as known in the art. The grinding wheel is a compacted abrasive material in an annular shape with a fixed diameter and wall thickness, which usually rotates in the same direction as the product to be ground. The compacted abrasive material of the grinding wheels may have been bonded by an alloying process in a furnace or by use of an adhesive type bond. Grinding wheel shapes are often disks formed with flat radial faces and outer radius surfaces, or wall thicknesses, perpendicular to the radial face. As a consequence, the intersection of these radial and outer radius faces produces sharp corners, which when used to grind railroad wheels can result in a sharp angle of attack on the to-be-ground surface, until natural wear and erosion reduce the severity of the angle at such corner.

SUMMARY OF THE INVENTION

The present invention provides an abrasive grinding wheel for removal of sprues and riser pads on the web face of a cast railroad wheel, which has sprues and riser pads in close proximity to the wheel hub. This grinding wheel is mountable on a grinding machine operable to accommodate the railroad wheel for the finishing operation. This finishing operation includes grinding most of the front plate surface to provide a smoother mechanical surface as well as a cosmetically appealing surface. The smoother front plate surface on the railroad wheel is needed for subsequent finishing and quality evaluation operations, which evaluation may include noting any subsurface inclusions or seams not obvious in the unground surface. The grinding wheel of the present invention has a recessed section and an outer surface contour for projecting it along the railroad wheel front plate closer to the railroad wheel hub for removal of all the riser pad in proximity to the front hub projection.

BRIEF DESCRIPTION OF THE DRAWING

In the several figures of the drawing, like reference numerals identify like components, and in those drawings.

DETAILED DESCRIPTION OF THE PREFERRED EMBODIMENT

Figure 5:
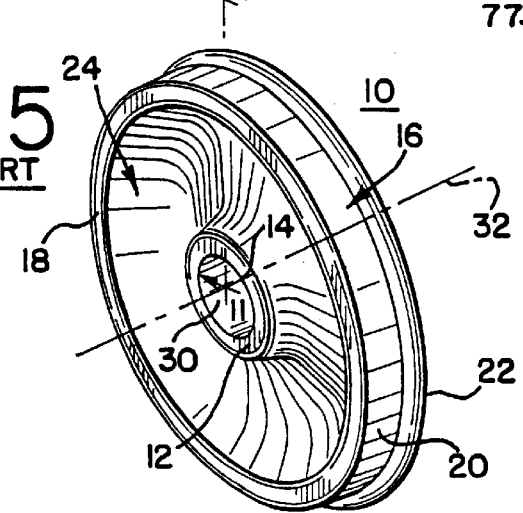
FIG. 5 illustrates an oblique view of an exemplary railroad wheel.
Figure 6:
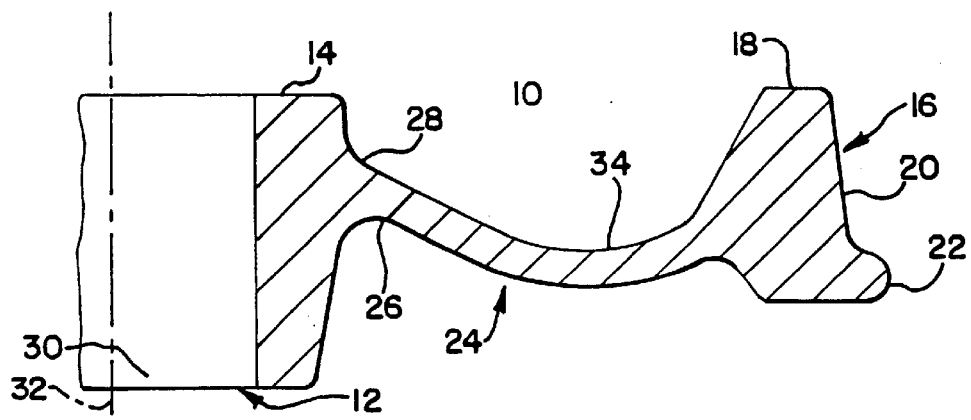
FIG. 6 illustrates a cross-section taken along line 11—11 of the wheel in FIG. 5.

In FIGS. 5 and 6, a representative railroad wheel 10 is shown in an oblique or profile view and a segmented sectional view, respectively. Wheel 10 has hub 12 with hub outer or front face 14 and, tread portion 16 with front rim face 18, tread 20 and flange 22. Contoured web or plate 24 connects hub 12 and tread portion 16, which plate 24 has back hub or inner fillet or corner 26 and, outer or front hub fillet or corner 28 in proximity to hub 12 and axle bore 30. Longitudinal axis 32 of wheel 10 centrally extends through bore 30. In these FIGS. 5 and 6, plate front or outer face 34 appears as a smooth, flawless continuum without blemish, bump or imperfection. As-cast railroad wheels 10 include an irregular plate front surface 34, including sprues and riser pads from the casting process.

The smoother plate front face 34 noted on wheels 10 in FIGS. 5 and 6 is generally attained by a grinding process to remove the sprues, riser pads and irregularities on surface 34. Grinding machine 50 in FIGS. 1, 2 and 3 includes swing frame assembly 53, motor or other drive means 52 and, feed frame and housing 51. Swing frame assembly 53 is noted in dashed outlined in FIG. 1. Drive means 52 along with feed frame and housing 51 are outlined in FIG. 2 to clearly distinguish them in the figures. Grinding machine 50 has grinding wheel 60 mounted on arbor driving-flange 54, which arbor driving-flange 54 is secured to spindle 64 and is pivotable about feed-frame pivot 68.

Figure 2:
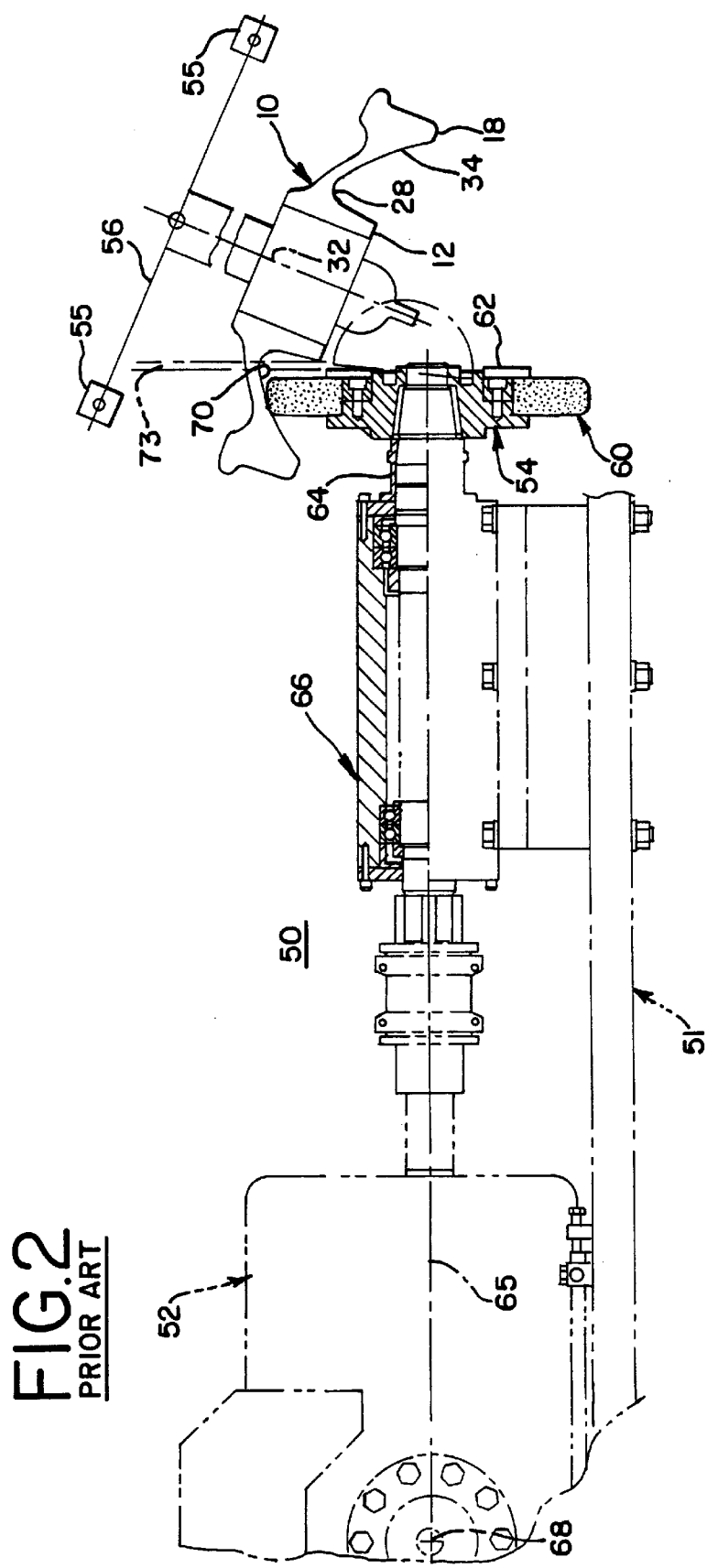
FIG. 2 illustrates an enlarged, partial cross-sectional view of the drive shaft, spindle, grinding wheel and railroad wheel in FIG. 1.

Arbor adapter flange 62 secures grinding wheel 60 to arbor driving flange 54 for rotation about spindle axis 65, as shown in FIG. 2. Illustrative of railroad wheel grinding machine 50 is the structure taught and disclosed in U.S. Pat. No. 5,209,021 to Christie et al., which is specifically directed to sprue removal and grinding of as-cast railroad wheels. In the structure and grinding operation of FIGS. 2 and 3, grinding wheel 60 on spindle 64 rotates about axis 65 and is pivotable with spindle 64 and spindle housing 66 about pivot 68 of feed frame 51. Railroad wheel 10 in swing-frame assembly 53 rotates about axis 32 and is simultaneously pivotable about pivot axis 56 of swing frame 55 to position railroad wheel 10, and more specifically plate front face 34 and hub front fillet 28, in proximity to grinding wheel 60. In the prior art illustration, grinding wheel 60 is limited in its ability to approach hub 12 since arbor adapter flange 62 can potentially contact and mar hub 12 or hub front fillet 28. The potential for contact between hub 12 and adapter flange 62 is noted in FIG. 3, as an example.

There is always a line of demarcation 70 between the ground surface and the unground area on the plate outer face 34. In the prior art apparatus and grinding wheel of FIG. 2, the distance between line of demarcation 70 and the unground riser pad in proximity to outer fillet 28 is an eyebrow 71, which may be greater than 0.75 inch.

Figure 1:
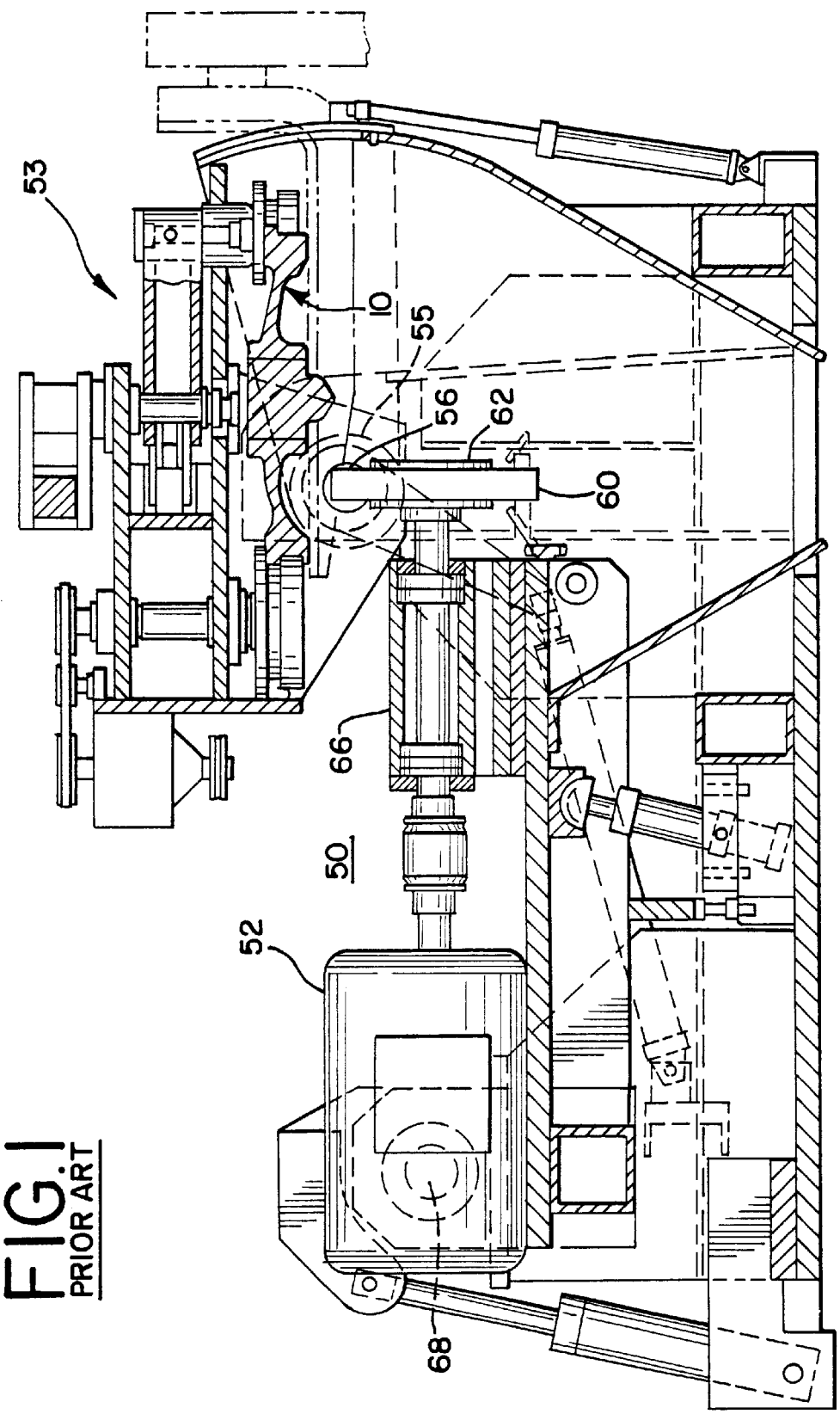
FIG. 1 is a cross-sectional elevational view of an extant railroad wheel grinding machine.
Figure 3:
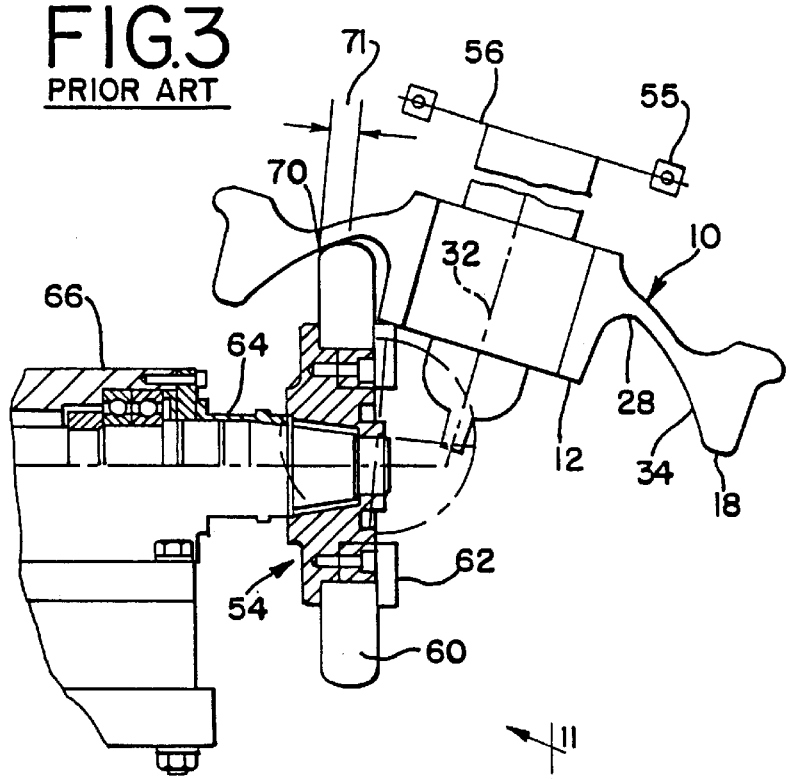
FIG. 3 is an enlarged cross-sectional view of the grinding wheel and spindle end of FIG. 2.

In FIG. 2, railroad wheel 10 is pivoting about axis 56 and rotating around axis 32 in swing-frame assembly 53 as grinding wheel 60 with flange 62 is rotating about axis 65 and moving with feed frame 51, which compound movement brings grinding wheel 60 in proximity to plate front surface 34. As an example of a grinding operation, railroad wheel 10 in FIGS. 1 to 3 is twenty-eight inches in diameter and, grinding wheel 60 was twenty-five inches in diameter and three inches thick. The results of the grinding test in this specific illustration produced a gap or eyebrow 71 greater than 0.75 inch between the line of demarcation 70 on this wheel and the unground riser pad in proximity to hub front fillet 28. The ground area of plate front surface 34 extends to front rim face 18. In this grinding operation and as shown in FIG. 2, second gap 73 between flange 62 and hub front face 12 is maintained to avoid contact between flange 62 and hub 12. Gap 73 consequently limits the proximity or penetration of grinding wheel 60 to hub front fillet 28 along plate front surface 34.

Figure 4:
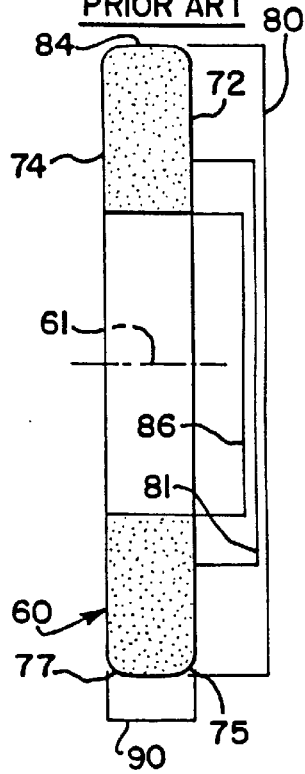
FIG. 4 is a cross-sectional view of the prior art grinding wheel in FIGS. 1 to 3.

The prior art grinding wheel 60 illustrated in FIG. 4 has a continuously pressed or compacted materials cross section, although a two-component cross-section is known, as are the use of stress rings, carrier segments and other ancillary components of grinding wheels and grinding heads. These ancillary components and other embodiments are not illustrated but are known in the art. Grinding wheel 60 has a generally annular shape in plan view with a bore axis 61, outer planar face 72 and inner planar face 74, which cross-sectional view of FIG. 4 appears generally as a rectangle. The planes of faces 72 and 74 are generally parallel. Wheel 60 is shown, as noted in the above example, with a 25-inch outer diameter 80 and an inner diameter 86. Outer surface 84 at the circumference of grinding wheel 60 in FIGS. 3 and 4 has a slight crown or curved surface, and the intersections of planar faces 72 and 74 with outer surface 84 are noted as arced corners 75 and 77, respectively. In this prior art embodiment, wall thickness 90 between planar faces 72 and 74 is currently three inches. This three-inch thickness is, at least partially, provided to accommodate the stress loads on wheel 60 during grinding. Diameter 81 noted on the outer face 72 of grinding wheel 60 illustrates the diameter of arbor adapter flange 62 on such outer face 72.

In FIGS. 2 and 3, railroad wheel 10 on machine 50 is being ground by grinding wheel 60, which grinding wheel 60 is three inches thick with a twenty-five inch diameter in this illustration. Railroad wheel 10 in this illustration is twenty-eight inches in diameter and is known to have riser pads in close proximity to hub 12. In the above-noted example, the grinding operation resulted in the above-noted eyebrow width of greater than 0.75 inch. In production operations, a larger diameter and thicker grinding wheel may provide a more economical tool as its production life may be extended because of its added mass, which may imply fewer grinding wheel changes. However, use of a thinner grinding wheel of the prior art configuration allows the user to grind plate front face 34 closer to hub front fillet 28, which removes more of the riser pad area and reduces the width of eyebrow 71.

Grinding wheel 60 is manufactured with a specific shape or contour at outer surface 84 for delivery to the user. However, outer surface 84 is subject to wear and erosion during normal grinding operations, which wear and erosion alter the as-delivered contour of outer surface 84.

The width of first gap or eyebrow 71 increases when a thicker grinding wheel 60 is used as it is more difficult to grind the entire riser pad area with the thicker grinding wheel 60. However, the thinner grinding wheels 60 have a shorter life during production use, which results in more frequent grinding wheel changes and increases in labor costs for such changes. Production efficiency is sacrificed when there are increases in the number of grinding-wheel changes along with the consequent increases in labor costs. Use of thinner grinding wheels 60 than previously utilized in prior practice for grinding railroad wheels 10 results in lost efficiency for the above-cited reasons, but this loss of efficiency is the cost for removal of the entire riser pad.

Figure 7:
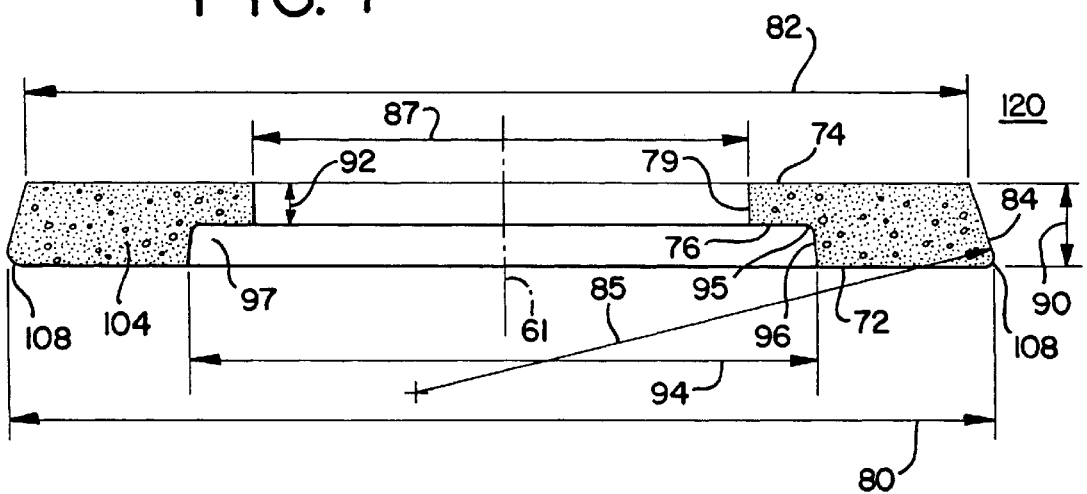
FIG. 7 is a cross-section of the grinding wheel of the present invention.

In the present invention, grinding wheel 120 in FIG. 7 is provided with a formed shape to accommodate a closer-to-the-hub grinding area for the narrower diameter railroad wheels 10. Outer diameter 80 of grinding wheel 120 at first planar face 72 is about 24-inches and the thickness of outer wall 90 is about 2 inches. The composition and inner core ancillary mounting equipment of grinding wheel 120 as well as the specific grinding wheel abrasive materials were provided by the Acme Abrasive Company to accommodate the specified grinding application. These materials are known and utilized in the art and have been noted as ACME Abrasive Company grinding wheel, as specified by Griffin Wheel Company drawing no. E-702.17-2.

Grinding wheel 120 in FIG. 7 is an annulus with longitudinal axis 61, second inner diameter 87 at inner planar face 74 and inner wall 79, and first inner diameter 94 at outer planar face 72, which first diameter 94 is greater than second inner diameter 87. First wall thickness 90 is provided between inner planar face 74 and outer planar face 72. Second wall thickness 92 is noted between inner planar face 74 and third planar face 76. Walls or wall thicknesses 90 and 92 intersect at shoulder 95 along third planar face 76 and first diameter 94, which has wall 96 extending generally vertically from third face 76 to outer face 72.

Grinding wheel 120 is manufactured with a contour at outer surface 84 corresponding to full contact between plate front face 34 at hub front fillet 28 and surface 84. Recontouring through wear or erosion of outer surface 84 and chamfer 108 is inhibited by altering the grinding sequence to utilize the sprues to dress the grinding wheel to maintain the as-delivered contour of grinding wheel 120.

As noted above, prior art grinding wheel 60 acquires an altered contour as it wears during usage. This altered contour of surface 84 is known to conform more closely to the shape of plate face 34 in proximity to rim outer face 18 than to hub outer fillet 28. This resultant grinding wheel shape is a consequence of the prior art grinding operation. That is, swing frame assembly 53 pivots and moves railroad wheel 10 across grinding wheel 60 or 120 until this grinding wheel 60 or 120 is contacting the riser pad area near hub front fillet 28. However, the contour of grinding wheel 60 and the angle of contact between plate front face 34 at hub front fillet 28 as well as the angle of movement of swing frame assembly 53 and spindle 64 displace front face 72 and corner 75 in prior art grinding wheel 60 from contact with plate front face 34, which displacement moves most of the grinding wheel contact, and consequent wear, at grinding wheel rear face 74, which has second inner corner 77 at the intersection of rear face 74 and outer surface 84. This displacement of grinding-wheel front face 72 from contact with plate front face 34 result in an eyebrow of the riser pad area remaining on plate front face 34, which is an undesirable consequence. Minimizing the width or thickness 90 of grinding wheel 120 allows the above-noted modified grinding sequence to use the sprues to re-dress grinding wheel surface 84 and maintain the as-delivered contour. However, physical constraints of grinding wheels generally dictate that there is a limit to the grinding-wheel wall thickness, as a wall thickness less than this limit will not support the side-loading forces from grinding operations without suffering catastrophic consequences, such as brittle fracture.

Grinding wheel 120 includes chamfered or rounded corner 108 at the intersection of planar face 72 and outer surface 84 with arc radius 85 for surface 84. As noted in FIG. 7, arc radius 85 extends from a spacial projection displaced from grinding wheel 120. Chamfered corner 108 permits a grinding operation with minimal concern for the potential for gouging plate front face 34, especially at the initial use of grinding wheel 120, which gouging can generate an undercut region in web surface 34. This flaw or undercut would be similar to a notch, which potentially can induce increased stresses or reduced strength in web 24. The combination of the structural arrangement or dimensional configuration of grinding wheel 120 in FIGS. 7 and 8 provides a grinding wheel 120 adequate to address the clearance problems associated with railroad wheel 10 and more specifically the proximity of riser pads on plate front face 34 to hub 12, which allows grinding of plate front face 34 for mechanical removal of surface imperfections, removal of sprues and riser pads, and a relatively smooth surface for aesthetic acceptability.

Figure 8:
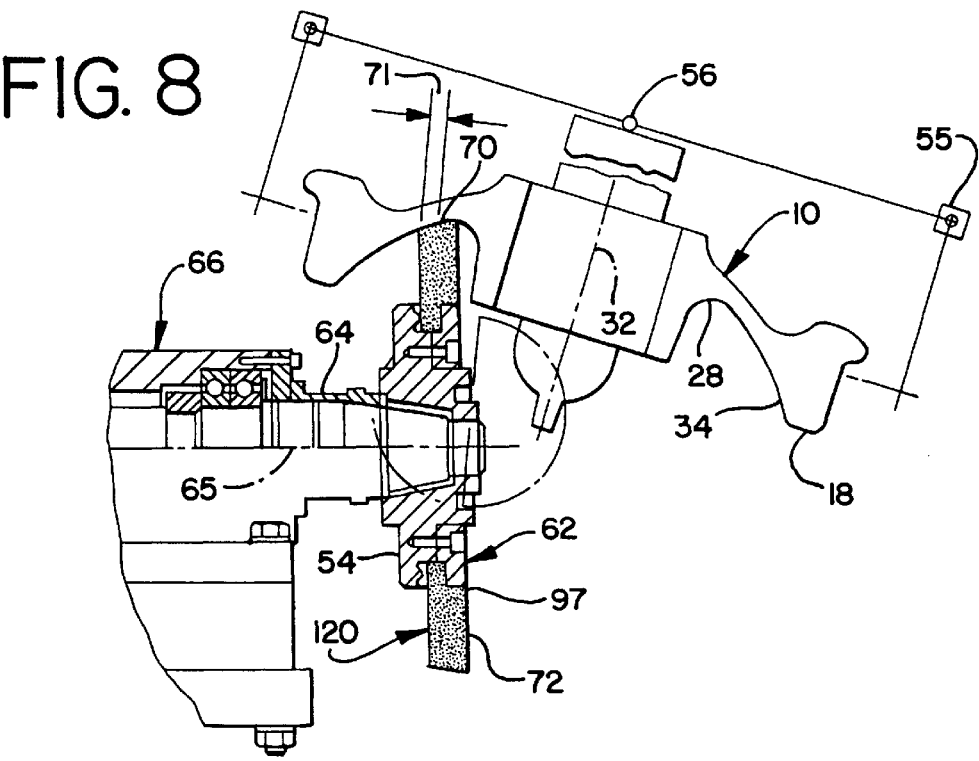
FIG. 8 is an enlarged view of the spindle end, railroad wheel and grinding wheel of the present invention.

Specifically, flange adapter 62 in FIG. 8 is nested in recess 97 of grinding wheel 120, which recess 97 is formed by outer wall 96 and third planar face 76, as also noted in FIG. 7. Recess 97 has third planar face 76 adequately displaced from first planar face 72 to internally accommodate adapter flange 62, thereby providing a flush or about coplanar flange surface with outer face 72 of grinding wheel 120. This structure allows contoured grinding surface 84 to grind the entire riser pad in proximity of hub fillet 28 without the fear of flange 62 contacting hub 12. Grinding wheel 120 has a more narrow wall thickness 90 than grinding wheel 60 to reduce the effect of the grinding-wheel contour on leaving an eyebrow. The flush surface between flange 62 and planar face 72 reduces the second gap distance 73, which also allows grinding wheel 120 to more closely approach hub 12.

Grinding wheel 120 provides enhanced depth penetration into the surface of web face 34 for grinding closer to hub 12 than does the prior art wheel or a smaller-diameter grinding wheel. The aversion to a smaller-diameter grinding wheel is related to the reduced grinding surface from such smaller-diameter grinding wheels, which results in more rapid wear and more frequent grinding wheel replacements. The first outer diameter 80 and the second outer diameter 82 of grinding wheel 120 can be selected to accommodate the size, that is the diameter, of railroad wheel 10, which as noted above may vary between 28 and 42 inches. The difference in the diameters of railroad wheels 10 is not restrictive of the performance of the grinding wheels 120 of the present invention. However, it is known that a larger diameter railroad wheel 10 will accept a larger diameter grinding wheel 120, and use of a larger diameter grinding wheel 120 can influence cost factors, but not performance of grinding wheel 120.

Use of grinding wheels 120 is accommodated by mounting railroad wheel 10 and grinding wheel 120 on machine 50 as described above. Grinding wheel 120 is pivoted about pivot 68 and railroad wheel pivots about axis 56, which pivoting actions bring grinding wheel 120 in proximity to plate front face 34. As previously noted, both railroad wheel 10 and grinding wheel 120 are rotating about their respective axes 32 and 65. Each of railroad wheel 10 and grinding wheel 120 are pivoted to track or trace the desired shape of plate front face 34. Thereafter, grinding wheel 120 tracks front face 34 of railroad wheel 10 between hub fillet 28 and outer rim face 18 to remove riser pads, sprues and other discontinuities from plate front face 34, while generally maintaining the as-delivered contour at face 84 and chamfer 108 of grinding wheel 120.

While the present invention has been described in connection with a specific embodiment thereof, it is to be understood that this is by way of illustration and not by way of limitation. The scope of the appended claims should be construed as broadly as the prior art will permit.

We claim:

1. A generally annular, abrasive grinding wheel for grinding a plate front face of a railroad wheel, said railroad wheel including a hub having a front face, a tread portion with a front rim and a generally curvilinear plate extending between said hub and said tread portion, which plate has said plate front face, said abrasive grinding wheel having a circumference, said grinding wheel comprising:
an outer surface at said circumference,
a first and outer face with a first outer diameter and a first inner diameter,
a second and outer face with a second outer diameter and a second inner diameter,
said second outer diameter being shorter than said first outer diameter,
said second inner diameter being shorter than said first inner diameter,
a grinding-wheel center line about normal to said first face, said second face, said first inner diameter, said second inner diameter, said first outer diameter and said second outer diameter,
said first face and said second face cooperating to define a first grinding-wheel wall thickness,
said outer surface at said circumference generally tapered between said first outer diameter and said second outer diameter,
a third face between and generally parallel to said first face and said second face,
said grinding wheel having a first internal surface with said first inner diameter at said first face, said first internal surface extending from said first face to intersect said third face,
a second internal surface with said second inner diameter, said second internal surface extending from said second face to intersect said third face,
said grinding wheel at said second internal surface having a second wall thickness between said second face and said third face, said second wall thickness being less than said first wall thickness,
said first internal surface inwardly tapered from said first and outer face at said first inner diameter to said third face at an acute angle, which first internal surface intersects said third face to define a shoulder,
said first and outer face intersecting said outer surface at said first outer diameter to define a first edge,
said second and outer face intersecting said outer surface at said second outer diameter to define a second edge, and
said outer surface at said circumference being an arc segment between said first face and said second face.

2. An abrasive grinding wheel as claimed in claim 1, wherein said first edge is chamfered.

3. An abrasive grinding wheel as claimed in claim 1, wherein said first outer diameter and second outer diameter are proportionately defined to a contour of said railroad wheel.

4. An abrasive grinding wheel as claimed in claim 1, wherein said arc segment generally conforms to said contour of said railroad wheel plate front face.

5. An abrasive grinding wheel as claimed in claim 1, wherein said third face and said first internal surface cooperate to define a recess in said grinding wheel to receive an arbor adapter retaining flange.

6. An abrasive grinding wheel as claimed in claim 5, wherein said arbor adapter flange in said recess has an outer surface, which flange outer surface is approximately coplanar with said grinding wheel first and outer face.

7. A method of grinding a curvilinear plate front face of a railroad wheel, which plate front face has a contour and a surface, said railroad wheel having a wheel hub with a front portion and a wheel front rim portion, said grinding provided to remove casting riser pads and sprues to improve the surface of the wheel plate front face and to enhance the physical appearance of said railroad wheel, which railroad wheel has a wheel axis through said hub, said method of grinding comprising:

a. mounting said railroad wheel in a swing frame of a swing-frame grinding apparatus, said grinding apparatus having a drive means and a grinding wheel spindle for retaining a grinding wheel;

b. providing a generally annular grinding wheel with a tapered outer surface, which grinding wheel has a first outer face with a first outer diameter and a second outer face with a second outer diameter shorter in length than said first outer diameter, said tapered outer surface extending between said first outer face and first outer diameter to said second outer face and second outer diameter;

c. mounting said grinding wheel on said grinding wheel spindle with said first outer face in a confronting relationship to said swing frame and mounted railroad wheel, said grinding wheel having an axis, said spindle generally aligned along said grinding wheel axis and having said grinding-wheel first outer face outwardly exposed from said spindle;

d. pivoting said grinding wheel in proximity to said railroad wheel plate front face and hub portion;

e. moving said grinding wheel and spindle to provide contact between said railroad wheel plate front face and said grinding wheel outer surface;

f. rotating said railroad wheel in said swing frame and said grinding wheel on said spindle; and, g. pivoting simultaneously and synchronously said railroad wheel in said swing frame and said grinding wheel on said spindle to contact said plate front face in close proximity to said front rim portion and thereafter pivoting said spindle and grinding wheel to contact said plate front face along said contour for smoothing said plate front face, and to remove said riser pads and sprues.

* * * * *